United States Patent [19]

Jolley et al.

[11] 4,055,902
[45] Nov. 1, 1977

[54] COMPASS WITH MEANS FOR CORRECTING ANGLE OF MAGNETIC VARIATION

[76] Inventors: William S. Jolley, 7934 NE. Alberta St., Portland, Oreg. 97218; William R. Cranford, 521 Gorgonia, Newport Beach, Calif. 92660

[21] Appl. No.: 655,845

[22] Filed: Feb. 6, 1976

[51] Int. Cl.² .............................................. G01C 17/38
[52] U.S. Cl. ..................................................... 33/356
[58] Field of Search ................... 33/355, 356, DIG. 1, 33/357, 358, 359

[56] References Cited

U.S. PATENT DOCUMENTS

| 931,359 | 8/1909 | Washburn | 33/356 |
| 1,639,580 | 8/1927 | Thompson | 33/DIG. 1 |
| 2,552,332 | 5/1951 | Le Van | 33/355 |
| 3,177,591 | 4/1965 | Jolley | 33/356 |

*Primary Examiner*—Richard E. Aegerter
*Assistant Examiner*—John W. Shepperd
*Attorney, Agent, or Firm*—Eugene M. Eckelman

[57] ABSTRACT

A compass card has a depending hub supported on a pedestal by a needle bearing and the compass magnet is capable of rotatable adjustment on such hub and also vertically slidable for adjustment of the compass. The bottom of the hub has a flange of permeable material such as iron or steel, and clearance is provided for the vertical movement of the compass magnet on the hub in an arrangement such that the magnet is arranged to be pulled away from the flange and rotatably adjusted by an outside key magnet to compensate for the magnetic variation of the area in which the compass is to be used. A low friction washer is provided on the compass card above the hub to permit rotatable adjustment of the magnet thereagainst as the compass card is held frictionally against the compass housing by the influence of the exterior magnetic key member.

4 Claims, 4 Drawing Figures

COMPASS WITH MEANS FOR CORRECTING ANGLE OF MAGNETIC VARIATION

BACKGROUND OF THE INVENTION

This invention relates to new and useful improvements in compass constructions and is more particularly concerned with improvements relating to means for correcting the angle of magnetic variation to make the compass accurate for a certain area.

Magnetic compasses of the type which operate in a horizontal plane are furnished to the consumer in a condition wherein the compass magnet is directed to the north magnetic pole on the compass card rather than to the true north geographic pole. Since many navigating means are charted in relation to the north geographic pole, corrections in compass readings for different areas must be made to compensate for this angle of variation. In my Patent No. 3,177,591, I provided a convenient means for correcting the angle of variation wherein by using a magnet key separate from the compass, the compass card can be rotated relative to the compass magnet and when the magnet key is removed, after first properly adjusting for the angle of variation, the compass card and the compass magnet will be reconnected and maintained in the corrected form.

SUMMARY OF THE INVENTION

According to the present invention and forming a primary objective therefore, I provide an improvement over the structure of my U.S. Pat. No. 3,177,591 in an arrangement wherein the means for correcting the angle of magnetic variation is extremely simplified and furthermore positive connection of adjustment is provided to insure that the magnet and compass card will not separate under normal usage even if the compass is bounced up and down or turned over.

To accomplish the above objectives, the compass card is provided with a depending hub for support on a pedestal, and this hub carries the compass magnet for slidable and rotatable adjustment. The hub has flange means at its lower end constructed of a magnetically permeable material, and this material provides a positive connection between the magnet and the compass card once the magnet is adjusted by an outside manually operated separate magnetic key which has sufficient magnetic power to overcome the attraction of the compass magnet to the flange.

The invention will be better understood and additional objects and advantages will become apparent from the following description taken in connection with the accompanying drawings.

DETAILED DESCRIPTION OF A PREFERRED EMBODIMENT

Figure 1:
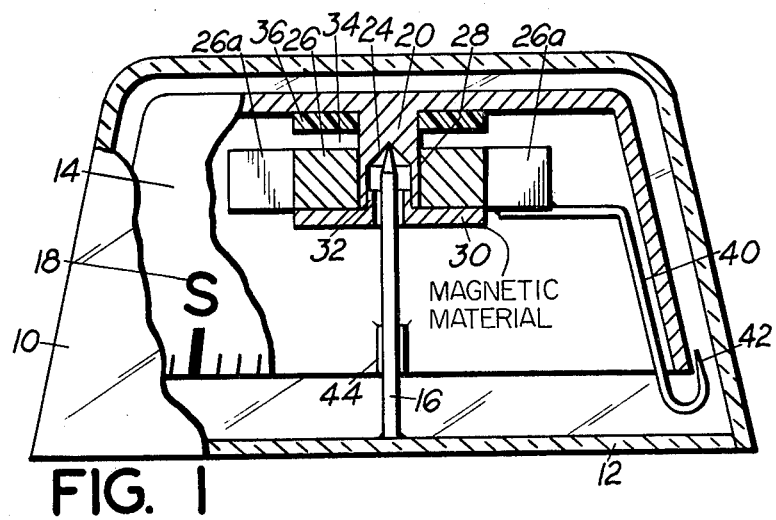
FIG. 1 is a cross sectional view of a compass embodying the present invention, the compass being shown in normal functioning position.

With particular reference to the drawings, the numeral 10 designates a transparent compass housing and the numeral 12 designates an integral base portion therefor. Housing 10 is generally sealed and contains a liquid therein in which operates a compass card 14 supported on a needle point support or pedestal 16 projecting integrally upwardly from base portion 12. Base portion 12 is usually associated with a standup support and/or a bracket for mounting the compass in a desired place.

The compass card 14 of the present invention comprises an inverted cup-shaped or skirted member with standard compass designations 18 thereon. Compass card 14 has a downwardly projecting central hub 20 provided with an upwardly extending recess 22 terminating at its upper end in a tapered seat 24 for rotational engagement by the pedestal 16. A compass magnet 26 has a central bore or opening 28 therethrough of a diameter to freely receive the hub 20. As will be apparent, the magnet 26 can have rotatable as well as vertical adjustment relative to the hub. Magnet 20 has integral wing projecting portions 26a, although it is to be understood that the shape of the magnet may vary to suit a specific compass application.

The lower end of the hub 20 has a bottom washer-like flange 30 secured thereto which is about the diameter of the round magnet body portion. Such flange may comprise an integral part of the hub 20 or may have suitable securement thereto as by an upwardly directed tubular extension portion 32 having a pressed or adhesive connection within the recess 22. Importantly, the flange 30 is formed of a magnetically permeable material such as steel or soft iron in order that there will be a magnetic connection between it and the compass magnet 26 in a connected arrangement such that the magnet 26 will rotatably operate the compass card 14 on the pedestal 16.

Hub 20 is of greater length than the thickness of the magnet so that a space 34 is formed between the lower surface of the top wall of the compass card and the upper surfaces of the magnet. The under surface of the compass card around the hub 20 is provided with a washer 36 preferably of suitable lubricating plastic material as teflon, nylon, or other low friction material. The washer 36 provides a low friction bearing between the magnet and the compass card during the adjusting step now to be described.

Figure 2:
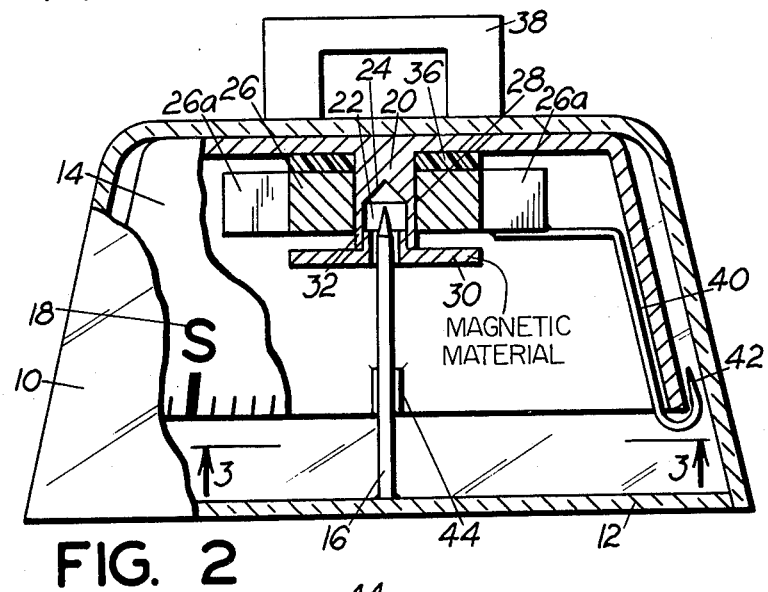
FIG. 2 is a view similar to FIG. 1 but showing the parts in position for adjusting the compass card.
Figure 4:
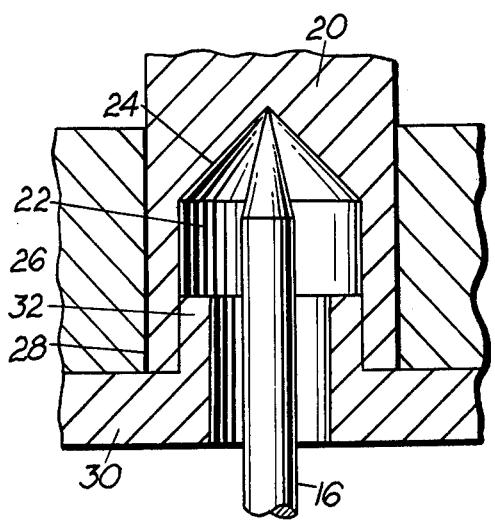
FIG. 4 is an enlarged detail view of hub support means for the compass card.
Figure 3:
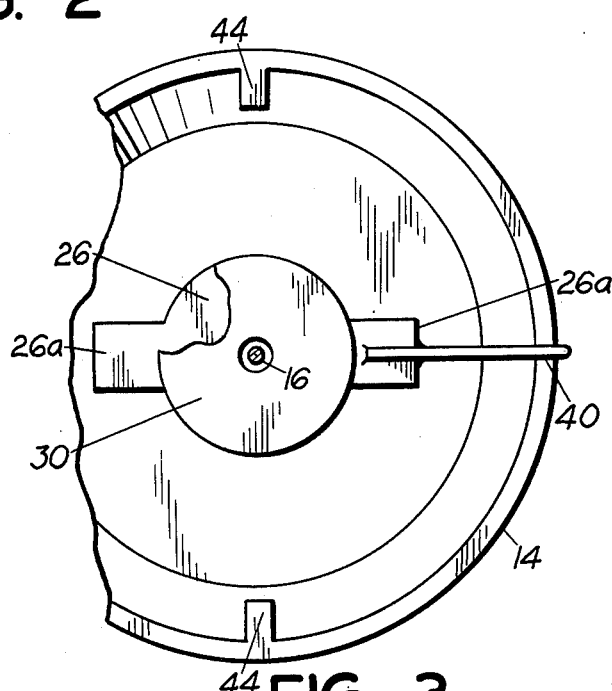
FIG. 3 is a fragmentary bottom plan view taken on the line 3—3 of FIG. 2.

Rotating adjustment of the magnet 26 relative to the compass card for correcting the compass is accomplished by an exterior key 38 in the form of a magnet. This magnet must be of sufficient magnetic power so that when the key magnet 38 is positioned at the top of compass housing 10 as shown in FIG. 2, with the magnets 26 and 38 located to have opposite pole locations, the magnet 26 will be separated from the flange 30. When the magnet 26 is separated from the flange 30 as stated, the upper movement raises the magnet into engagement with the washer 36 and then the compass card is raised into engagement with the compass housing. Thereby, upon rotating the magnet key 38, the compass magnet 26 can be rotated therewith to adjust the angle of magnetic variation. Since the compass card has a rather large friction engagement with the upper interior surface of the housing 10 when lifted thereagainst and since the magnet has a rather small friction engagement with low friction washer 34, the magnet 26 will freely turn while the compass card is held stationary. Thus, the proper adjustment is readily accomplished.

A pointer 40 is secured to the compass magnet 26 and extends downwardly and under the compass card. This pointer terminates in an upturned tip 42 extending into the plane of the compass designations 18 on the outer surface of the compass card. The adjustment of the compass magnet is determined by viewing the tip 42. As an example of adjustment of the present compass, if the magnetic variation of an area is 23° from the north geographic pole, the magnet 26 is simply adjusted around in the proper direction to move the tip 42 such amount off of the north designation.

In order to prevent over adjustment of the magnet, the compass card is provided with diametrically disposed stop projections 44 in the path of pointer 40. These projections are preferably located approximately 90° around from north or in other words approximately at the east and west designations. Without such stops, confusion from overturning magnet 26 in its adjustment may result. The 90° adjustment allowed by the stops is sufficient for all areas on earth.

The present invention has the advantage of being simplified in construction and furthermore, with the flange 30 always being confined within the influence of magnet 26, even though the magnet is spaced thereabove during adjustment, the magnet will always return to firm locked position upon release thereof from the magnet key 38. This will occur even if the compass is turned upside down. The magnet 26 will not separate from the flange 30 by up and down movements of the compass under normal circumstances under which the compass is used and thus it cannot get out of adjustment. The compass can be sold as a permanent adjusted compass or if desired adjustment can be readily made by persons in the area that the magnet is to be used.

It is to be understood that the form of my invention herein shown and described is to be taken as a preferred example of the same and that various changes in the shape, size and arrangement of parts may be resorted to without departing from the spirit of my invention or the scope of the subjoined claims. For example, although a skirted compass card 18 is illustrated, other types may be used, it only being necessary to have a hub support for the magnet 26 and to have a flange 30 constructed of magnetically permeable material.

Having thus described my invention, I claim:

1. A magnetic compass comprising
   a. a housing,
   b. a rotatable compass card having a top wall,
   c. means in said housing rotatably supporting said compass card therein on substantially a vertical axis,
   d. a projecting hub integral with said compass card,
   e. a flange integral with said hub and spaced from said top wall,
   f. said flange being formed of magnetically permeable material,
   g. and a compass magnet rotatably mounted on said hub between said flange and said top wall of said compass card and being magnetically attracted to said flange for connecting said magnet to said compass card for unitary rotation,
   h. said hub being longer than the thickness of said magnet whereby the latter can be moved out of engagement with said flange into engagement with said top wall and also rotatably adjusted relative to said compass card by an exterior magnet of sufficient magnetic power, whereby to correct the angle of magnetic variation by rotating said compass magnet by the exterior magnet and then removing the exterior magnet to permit said compass magnet to re-engage with said flange in the adjusted position,
   i. the space between said flange and said top wall being pre-selected relative to the thickness of said magnet such that said flange when said magnet is moved into engagement with said top wall by the exterior magnet still is within the influence of said compass magnet.

2. The magnetic compass of claim 1 wherein said hub extends downwardly from said compass card centrally thereof and has a bottom end and means defining a recess leading upwardly in said hub from its bottom end, a pedestal in said housing engaged in said recess for rotatably supporting said compass card, said flange being disposed adjacent to the bottom of said hub supporting said compass magnet thereon.

3. The magnetic compass of claim 1 wherein said hub extends downwardly from said compass card centrally thereof and has a bottom end, said flange being disposed adjacent to the bottom of said hub and supporting said compass magnet thereon, and friction reducing means between said compass magnet and said compass card to provide reduced friction of rotation between said compass magnet and said compass card.

4. The magnetic compass of claim 3 including a pointer secured to said compass magnet, said pointer extending to an exterior portion of said compass card adjacent to compass designations on said card, and stop means on said compass card in the path of rotation of said pointer to limit adjusting rotation of said compass magnet.

* * * * *